April 19, 1960  D. M. MOORE ET AL  2,932,971
TEMPERATURE INDICATOR
Filed Feb. 11, 1957
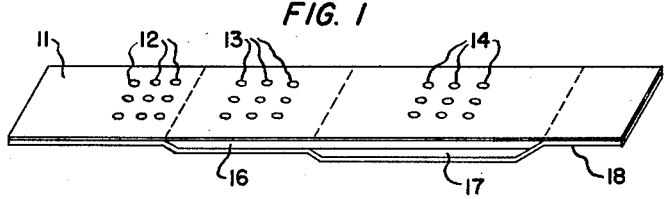
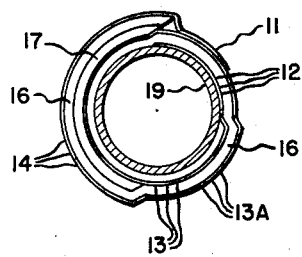
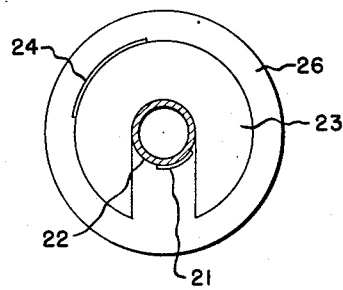
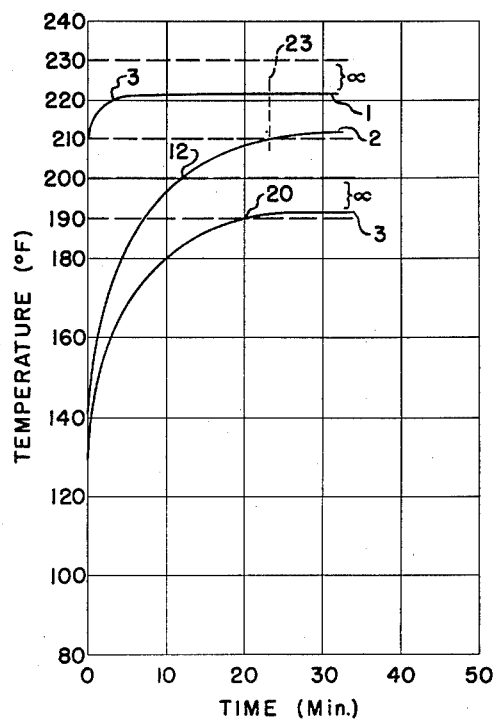
INVENTORS
DWIGHT M. MOORE &
HOWARD FIELD JR.
BY
ATTORNEY

United States Patent Office 2,932,971
Patented Apr. 19, 1960

2,932,971

TEMPERATURE INDICATOR

Dwight M. Moore and Howard Field, Jr., San Diego, Calif., assignors to General Dynamics Corporation (Convair Division), San Diego, Calif., a corporation of Delaware Application February 11, 1957, Serial No. 639,363

1 Claim. (Cl. 73—356)

This invention relates to temperature indicating devices and more particularly to a device for indicating peak and sustained temperatures to which a specimen may be subjected.

In testing the performance of hydraulic and lubrication systems in aircraft, for example, it is important to know the peak temperature and the normal operating temperature to which the fluid, seals, and other components are exposed. Since the lubricity and viscosity of oil varies with temperature, by knowing the normal operating and peak temperatures the type of oil for a particular system can be determined. Sediment depends upon rate of oxidation which, in turn, varies with temperature. Thus, known operating temperature gives an overhaul time prediction. The effectiveness and duration of various types of seals is dependent upon their temperature environment. Temperature also is an indication of the performance of the equipment.

In certain types of equipment permanant temperature gauges are installed and are constantly observed by the operator. In other systems only an occasional temperature reading is desired. The time and expense of installation of temperature sensing equipment is often a determining factor when occasional readings are desired. Weight and space requirements often make such installations prohibitive. These disadvantages have been overcome to a large extent through the use of temperature indicating materials readily available on the market. These include chemicals, dyes, paints, crayons, oil solvents, etc., that melt, fuse, change color or otherwise react to temperatures above various critical minimum values. These temperature indicating materials however react quickly to the increase in temperature and thus indicate the highest achieved temperature without regard to the time they have been exposed to that temperature. Since seals, oil, fluids and other hydraulic and lubricating components can withstand temperatures above their maximum critical sustained values for short periods of time without detrimental effect, and since a short highest temperature value does not necessarily indicate the normal operational temperature of the system, these temperature indicators are not suitable for the purposes intended in the present invention.

The sustained temperature indicator comprising the present invention utilizes a thermal lagging principle in which the highest attained temperature is indicated with temperature responsive materials adjacent the specimen and a lower sustained temperature is indicated with temperature responsive materials spaced from the specimen through a layer of thermal lagging material. Thermal lagging material is any material which, due to its properties of insulation or heat absorption, delays the rate of temperature change through it. The difference between the two temperature indications gives an approximation of the duration of the highest attained temperature. The two temperature responsive materials and the heat lagging material preferably may be combined into a single strip which may be wrapped around a tube or applied to the specimen with an adhesive or other securing means.

It is therefore an object of this invention to provide for a temperature sensing device for indicating peak and sustained temperatures.

Another object is the provision of a temperature sensing device for determining the time duration of the maximum temperature sensed.

Another object is the provision of a temperature sensing device for determining the time duration of a peak temperature through differential temperature readings.

Another object is the provision of a temperature indicating device for indicating a temperature at the point of contact with a specimen and at a point spaced therefrom through a thermal lagging material.

Another object is the provision of a temperature indicator having a minimum of weight and volume for use in areas inaccessible to conventional temperature indicators.

Another object is the provision of a temperature indicator whose low cost and simplicity and ease of installation and removal adapts it for use where only one temperature reading or occasional temperature readings are desired.

Another object is the provision of a simple reliable method for determining the operating temperature of a fluid, mechanical or electrical system or apparatus.

Another object is the provision of a method for determining the time duration of the peak temperature of a fluid, mechanical or electrical system or apparatus.

Other objects and features of the present invention will be readily apparent to those skilled in the art from the following specification and appended drawings wherein is illustrated a preferred form of the invention, and in which:

Figure 1 shows one embodiment illustrating the present invention;

Figure 2 is a cross-sectional view showing one application of the embodiment;

Fig. 3 shows another application; and

Figure 4 illustrates how several heat sensitive strips may be used for greater sensitivity in temperature determination.

Referring now to Figure 1 there is shown in perspective a strip of conductive material 11, such as metal foil for example, having sets 12, 13 and 14, of spots thereon. Each of the spots is sensitive to a particular temperature and when that temperature critical to that spot is reached, depending upon the material from which the spot is formed, it melts, fuses, changes color or otherwise reacts to give an indication that that particular temperature has been reached. Chemicals, dyes, paints, metals, crayons, oil solvents and other materials are commercially available and are well known to those presently skilled in this art. The selection of materials depends upon the width of range of temperatures expected and the maximum allowable range between consecutive indicated temperatures. Under the second set 13 of spots is a layer of thermal lagging material 16 which permits a relatively slow heat transfer therethrough. Glass wool and blotter paper both have been satisfactory for this purpose although other materials are equally well suited. When exposed to heat of a certain temperature from the underside of strip 11 all of the spots in set 12 sensitive to temperatures up to that temperature will give a reaction which can be detected upon inspection. The spots in set 13 will indicate the same temperature in like manner only if that temperature has been sustained long enough to penetrate through the thermal lagging material 16. Otherwise the spots in set 13 will indicate the highest temperature of heat from under the strip which has been sustained long enough to penetrate through the material 16. If the temperature of the heat source is a rapidly fluctuating one the temperature indicated by set 12 may be considerably higher than that temperature indicated by set 13.

Under strip 11 below the spots in set 14 is an additional layer of insulation material 17. This also may be thermal lagging, i.e., not a perfect insulator, for the purposes to be explained in connection with Figure 4, or it may be a heavy insulation to attenuate heat transfer when used in the manner shown in Figure 2. In this use the spots in set 14 are optional. The underside of strip 11 is coated with a pressure responsive heat resistant adhesive and covered with a removable backing 18 in a manner similar to the familiar first aid adhesive bandage. This backing is removed and the strip is pressed onto the test surface being heated or from which the heat is being conducted.

As shown in Figure 2, strip 11 may be wrapped around a fluid duct or tube 19. Mechanic's tape or a cord may be used instead of the adhesive backing if desired. Here the peak temperature of the fluid in tube 19 is indicated with spots 12 since that portion of strip 11 is in direct contact with the tube 19. Spots 13 are spaced from the tube by one thickness of thermal lagging material 16 and spots 13A are spaced by two thicknesses. Spots 14 are spaced by two thicknesses of lagging material 16 and a layer of insulation 17. While spots 13A and 14 are helpful in obtaining greater accuracy of operating and peak temperatures, they may be omitted if desired. This application is especially useful in gathering temperature data from fuel, hydraulic, lubrication electrical and heat exchange systems in an apparatus wherein weight and space distribution factors need not be changed. In this manner other tests may be conducted simultaneously without interference from the temperature data gathering instrumentation because the weight and size of the strip is negligible. This type of application is also useful in checking the operation of more delicate and sensitive temperature gathering apparatus in the presence of vibration and other undesirable environment.

Figure 3 shows the use of the temperature indicating strips with a heat sink. Here strip 21 is mounted on tube 22 in the manner described with reference to Figure 2 or it may be mounted with the length of the strip paralleling the axis of the tube. A heat sink 23 with a large heat absorbing mass is mounted on the tube. The heat absorbing surface of the sink may be small as compared to its heat capacity. This effects a delay or thermal lag before the temperature of the sink approaches the temperature of the tube. A second temperature indicating strip 24 is applied to the outer surface of sink 23 and an adequate covering 26 of insulation is applied to attenuate heat transfer from the area. By noting the difference between the maximum surface temperature of the tube 22 and the temperature of the heat sink 23 it is possible to estimate the duration of the maximum surface temperature. If the difference is small, the maximum temperature must have existed for a longer time than if the difference were large. In the case of a fluctuating temperature the upper portion of the fluctuating temperature curve will not be indicated on strip 24 and a mean operating temperature can be derived.

By changing the mass or heat capacity of the sink or separating the heat sinks heat absorbing surface from the tube by a heat lagging material a greater or lesser lag is achieved. It is desirable to calibrate the temperature lag of the various types and sizes of thermal lagging and heat sink material in order to properly interpret the temperature indications achieved. Figure 4 is an exemplary temperature versus time chart showing response curves of three sets of temperature indicating spots adjacent the heat source and at two different thicknesses of thermal lagging material from the same heat source. This is shown merely to explain how the results of the use of the strips may be made. Here curve 1 rose to 220° in 3 minutes and then tapered off to a very shallow curve. Curve 2 rose to about 210° and then tapered to a flat response. Curve 3 is almost flat above 190°. Assume that the readings from the 3 sets of spots placed at the 3 different thicknesses show temperatures of 220° to 230°, 200° to 210°, and 190° to 200°, respectively. From curve 1 it is known that the peak temperature of from 220° to 230° lasted from at least 3 minutes to some indefinite maximum time. From curve 2 we know that the indicated temperature at point 2 lasted from 12 to 23 minutes. If the temperature at point 1 had remained above 220° for longer than 23 minutes the spots at point 2 would have indicated a maximum temperature above 210°. Since the spots at point 2 indicated a maximum temperature below 210°, the peak temperature of above 220° could not have lasted over 23 minutes. Thus the peak temperature of 220° to 230° was of at least 3 minutes' and no more than 23 minutes' duration. From the temperatures indicated at points 2 and 3 we also know the thermal history of the heat source during the test interval. The temperature was at least 200° for at least 12 minutes and at least 190° for at least 20 minutes. We also know that the temperature was not over 210° for more than 23 minutes and was never over 200° thereafter. If greater sensitivity or accuracy is desired, more sets of temperature indicating spots may be used spaced through more layers of lagging material. By making the lagging material thinner or using material of faster conductivity, the calibration lines will be closer together on the chart. Also the spots may be of materials having a smaller range between consecutive indicating points.

It should be borne in mind that in the use of the temperature indicator as above described that the spots spaced from the heat source should be insulated from heat transfer from another source or that part of the heat received is radiated or conducted away from the spots before the spots can indicate the actual temperature of the heat source. This is especially true, for example, when this device is attached to quick-frozen food packages. Here it is desirable to read the temperature indicating spots at various thicknesses of lagging material away from the package at all times without removing the strip. In order to do this a clear plastic insulation covering may be provided which has a heat lag time constant at least equal to, or greater than, the heat lag of the lagging material used. In this manner, all of the sets of spots may be seen without removal of the strip and without error due to heat transfer at the spots from sources other than the surface of the package.

While certain preferred embodiments of the invention have been specifically disclosed, it is understood that the invention is not limited thereto as many variations will be readily apparent to those skilled in the art and the invention is to be given its broadest possible interpretation within the terms of the following claim:

What we claim is:

A strip of material having a plurality of sets of heat responsive materials thereon, layers of thermal lagging material, one of said sets being adapted to be placed adjacent a heat source and the rest of said sets being spaced from said heat source through various thicknesses of said lagging material.

References Cited in the file of this patent
UNITED STATES PATENTS

| | | |
|---|---|---|
| 2,118,144 | Berman et al. | May 24, 1938 |
| 2,666,089 | Gier et al. | Jan. 12, 1954 |
| 2,716,065 | Beckett et al. | Aug. 23, 1955 |
| 2,799,167 | Loconti | July 16, 1957 |

FOREIGN PATENTS

| | | |
|---|---|---|
| 101,901 | Germany | Oct. 16, 1923 |
| 391,428 | Great Britain | July 23, 1931 |
| 141,266 | Canada | Mar. 17, 1949 |